July 29, 1941.  F. M. SHANAHAN  2,251,072
SEAT CONSTRUCTION
Filed Nov. 8, 1937
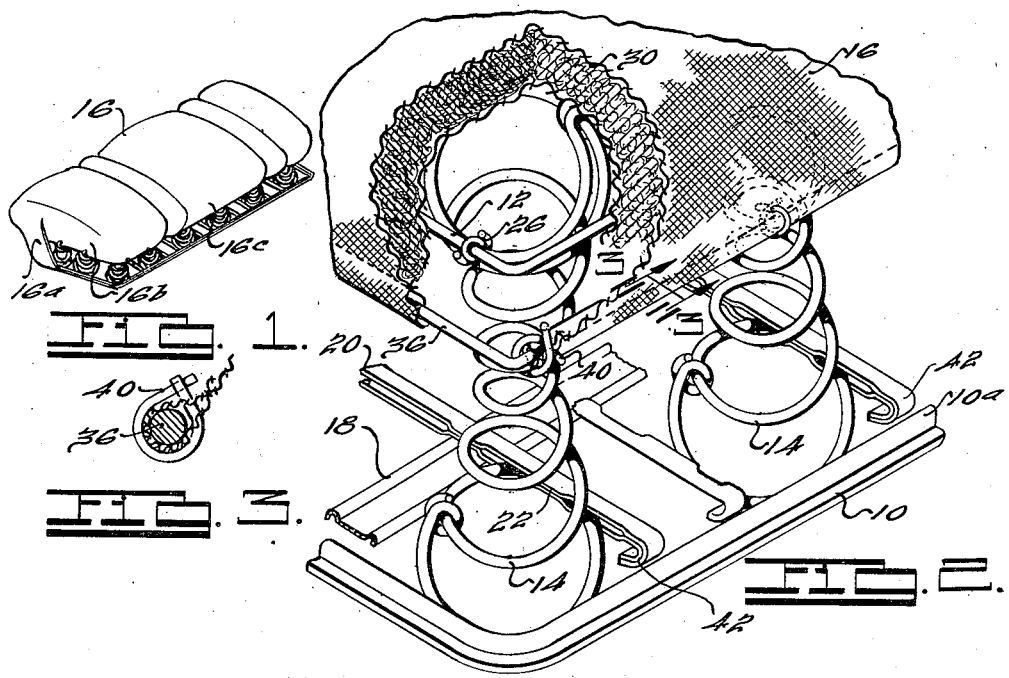
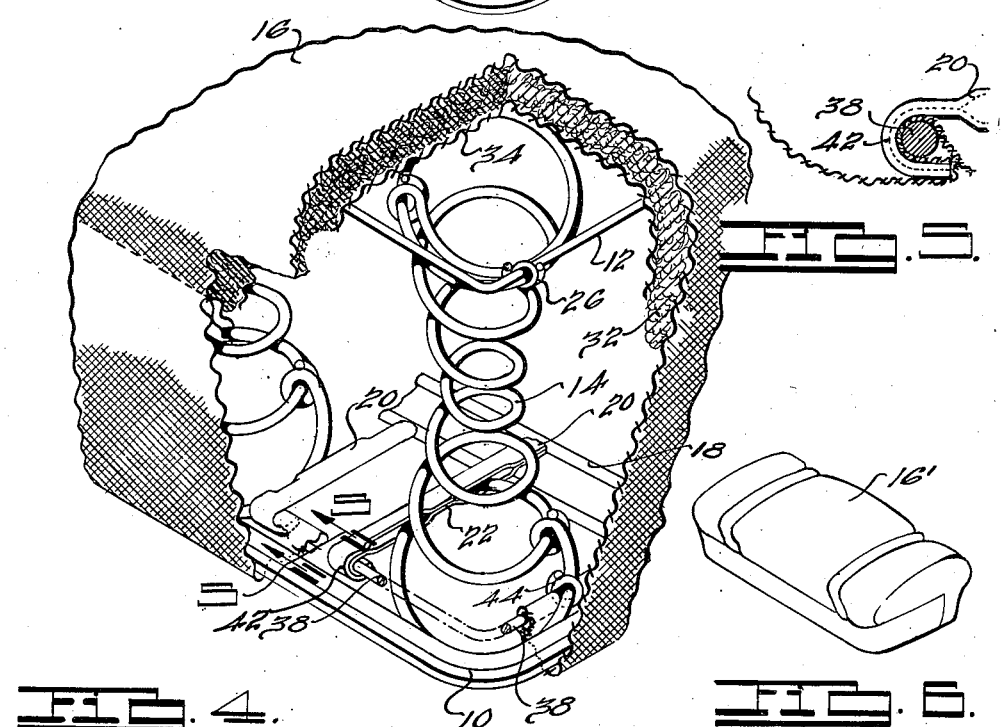
INVENTOR
FRANK M. SHANAHAN
BY
Harness, Dickey & Pierce.
ATTORNEYS.

Patented July 29, 1941

2,251,072

UNITED STATES PATENT OFFICE 2,251,072

SEAT CONSTRUCTION

Frank M. Shanahan, Detroit, Mich., assignor to The Murray Corporation of America, Detroit, Mich., a corporation of Delaware Application November 8, 1937, Serial No. 173,359

4 Claims. (Cl. 155—180)

The present invention relates to seat construction and provides a seat construction of improved form, as well as an improved construction of the individual elements thereof.

Objects of the present invention are to provide a seat construction, particularly but not necessarily adapted for use in automobiles, which may be economically manufactured and assembled; to provide such a construction characterized in that the trim material at the rear side and parts of the ends of the seat may be eliminated; to provide such a construction providing an improved method of and means for securing the trim material to the seat structure; to provide such a construction embodying a trim pad characterized as having a connecting border wire or the like formed integrally therewith; and to provide such a construction in which the trim pad is secured to the seat structure through the just mentioned border wire or the like.

With the above, as well as other objects in view, which appear in the following description and in the appended claims, preferred but illustrative embodiments of the invention are shown in the accompanying drawing, throughout the several views of which corresponding reference characters are used to designate corresponding parts, and in which:

Figure 1 is a view in perspective of a seat construction embodying the invention;

Fig. 2 is an enlarged fragmentary view in perspective of a rear corner of the construction of Fig. 1;

Fig. 3 is a fragmentary detailed view taken along the line 3—3 of Fig. 2;

Fig. 4 is an enlarged fragmentary view in perspective of a front corner of the construction of Fig. 1;

Fig. 5 is a fragmentary detailed view taken along the line 5—5 of Fig. 4; and,

Fig. 6 is a view in perspective of a modification of the invention.

It will be appreciated from a complete understanding of the invention that the improvements thereof may be embodied in seat constructions designed for a wide variety of specific purposes. In their preferred form, however, and as specifically illustrated herein, the improvements of the present invention are applied to seat constructions for automobiles.

Referring first to the embodiment of Figs. 1, 2, 3, and 4, the illustrated construction comprises generally a lower frame member 10, an upper border wire 12, a plurality of vertically disposed coil springs 14, and a trim pad 16 which is secured over the frame structure in the manner hereinafter described.

The lower frame member may be, and preferably is, formed of a unitary rectangular strip, the inwardly presenting edge of which is formed as a channel 10a, to receive the lower ends of the springs 14. The frame 10 is provided with one or more longitudinally extending supporting ribs, the opposite ends of which are secured to the corresponding ends of the frame 10, and which serve to support the transversely extending spring supporting members 20. The spring supporting members 20 are of generally channel form, the flanges of which are turned in at intervals as indicated at 22, to grip the ends of the springs 14.

The upper frame member 12 may, and preferably does, comprise a rectangularly formed wire-like member, which is secured as by a plurality of hog rings 26 to the upper end of the coil springs 14. Conventional intermediate connections (not shown) may be utilized between the upper ends of the individual coil springs 14, so as to secure the individual coil springs in unit relation between the upper frame member 12 and the lower frame member 10. To the extent thus far described, the seat construction is conventional, so that a more detailed description is not believed to be necessary.

In accordance with the present invention it is found that a substantial savings in the cost of manufacturing seat constructions may be effected by so forming the trim pad 16 or its equivalent as to cover only those parts of the seat construction as a whole which would otherwise be exposed during use. Accordingly, as clearly appears in Fig. 1, the trim pad 16 is formed to completely enclose the top, the front edge, and a front portion 16a at each end of the seat. The trim pad 16 is extended to cover the upper end portions 16b and also the upper portion 16c of the rear edge. The remaining portions at each end and at the rear edge, however, remain exposed. This reduction in the coverage provided by the trim pad 16 is found entirely satisfactory in connection with rear automobile cushions, since the co-operating parts of vehicle bodies enclose all of the just mentioned parts which are not covered by the trim pad 16. Conventionally, a greater part of the ends of automobile front cushions are exposed than in the case of the rear cushions. This difference, however, may be taken care of in the practice of the invention by extending portion 16a of the pad sufficiently far to the rear so as to enclose the parts of the seat ends which are not concealed by the vehicle body.

The trim pad 16 may, and preferably does, comprise an outer trim fabric 30, a cotton bat 32, and an inner or backing cloth 34. In order to secure the trim pad 16 to the frame construction, it is provided with an upper border wire element 36, and a lower border wire element 38. Both border wire elements 36 and 38 are preferably sewn into the trim pad as a part of the manufacture thereof, and prior to the assembly thereof with the frame construction. The upper border wire element is illustrated as being formed of a single strip of wire, which extends throughout the rear edge of the trim pad 16 and also extends along each end throughout the end portion 16b. The lower border wire element 38 is of corresponding U-shaped form and extends throughout the front edge of the pad 16 and also throughout the end portion 16a thereof.

The upper border wire element 36 is directly secured to the coil springs 14 at points intermediate the ends thereof by means of the hog rings 40, which are of conventional form and, as shown, encircle the border wire 36 and a turn of the corresponding spring 14. The feature of directly connecting the border wire 36 to the coil spring 14 is of substantial advantage, in that it is a connection which may be readily and quickly made and at the same time avoids any heretofore necessary tacking operations between the trim pad and a supporting frame.

The lower border wire 38 may be readily and quickly secured to the frame structure by passing it under the lower frame member 10 and inwardly thereof, bringing the border wire 38 into the inwardly presenting hook-like portions 42 which are formed at the ends of the transverse supporting members 20. These portions of the border wire 18 may be readily snapped into place within the hooks 42 and, when so connected, are positively retained in place by the resiliency of the trim pad 16 and of the springs 14. The end portions of the lower border wire 38 are secured to the frame structure by means of hog rings 44 which are engaged around the border wire 38 and around an adjacent turn of one of the coil springs 14.

It will be appreciated from the foregoing that the assembly of the trim pad 16 with the seat construction may readily be effected. Briefly restated, this assembly operation comprises fitting the trim pad 16 over the frame construction, stretching the border wire 36 downwardly over the rear and corresponding end portions to a suitable degree, and connecting the hog rings 40 between the border wire 36 and the springs 14; stretching the front edge portion of the trim pad 16 and the lower border wire 38 around and inwardly of the lower frame member 10 so as to insert the corresponding parts of the border wire 38 in the hook 42 at the end of the transverse portion 20; and finally connecting the end portion of the border 38 to the springs 14 beneath the hog rings 44.

It will be further appreciated that the improvements of the present invention may readily be extended to completely enclosed seat constructions such as shown in Fig. 6, in which the trim panel 16 is provided with completely enclosed front, rear and end portions. In so extending the invention, it will be appreciated that previously described end sections of the lower border wire 38 are extended so as to cover the entire corresponding seat ends. It will also be appreciated that the previously described upper border wire 36 is eliminated and replaced by a rear edge portion for the lower border wire. It is noted that in such instance the lower border wire 38 is preferably formed in at least two sections, so as to permit it to be passed down around the outside of the frame structure and thence upwardly and inwardly therein.

Although only two specific embodiments of the invention have been described in detail, it will be appreciated that various modifications in the form, number, and arrangement of the parts may be made therein within the spirit and scope of the invention.

What is claimed is:

1. In a removable cushion construction for a seat, a base frame, a plurality of springs, transverse means on said frame which with the frame supports said springs, a wire forming a border at the top of said springs to which it is secured, a preformed cover for enclosing the top, the front, and a portion of the sides of said springs, and a pair of oppositely presenting U-shaped wires disposed in the edge of said cover, the wire at the rear of the cover being disposed in a plane above the plane of the wire at the front thereof, means for securing one of said wires to certain of said springs, and means for securing the other wire inwardly of said frame.

2. In a removable cushion construction for a seat, a base frame, a plurality of springs, transverse means on said frame supporting said springs, a wire forming a border at the top of said springs, a preformed cover enclosing said springs, a pair of U-shaped wires disposed in the bottom edge of said cover, the wire at the rear of the cover being disposed in a plane above the plane of the wire at the front thereof, means for securing said front wire and bottom edge of the cover inwardly of said base frame, and means for securing said wire in the rear portion of said cover to the springs interjacent their ends.

3. In a removable cushion construction for a seat, a base frame, a plurality of springs, transverse means on said frame supporting said springs, a wire forming a border at the top of said springs, a preformed cover enclosing said springs, an enlarged edge portion provided on the front and rear of said cover, means for securing the cover about the edge of the base frame by said enlarged edge portion, and means for securing the rear enlarged edge portion to the springs interjacent their ends.

4. In a removable cushion construction for a seat, a base frame, a plurality of springs, transverse means on said frame supporting said springs, a wire forming a border at the top of said springs, a preformed cover enclosing said springs, elements in the ends of said cover secured to the ends of the transverse supporting means of the frame, and additional means for securing a portion of the cover edge directly to the springs interjacent their top and bottom.

FRANK M. SHANAHAN.